United States Patent
Caps

(10) Patent No.: US 9,688,048 B2
(45) Date of Patent: Jun. 27, 2017

(54) FILM-COATED VACUUM INSULATED PANEL

(71) Applicant: va-Q-tec AG, Würzburg (DE)

(72) Inventor: Roland Caps, Kleinwallstadt (DE)

(73) Assignee: va-Q-tec AG, Würzburg (DE)

(*) Notice: Subject to any disclaimer, the term of this patent is extended or adjusted under 35 U.S.C. 154(b) by 0 days.

(21) Appl. No.: 14/893,976

(22) PCT Filed: May 27, 2014

(86) PCT No.: PCT/IB2014/000874
§ 371 (c)(1),
(2) Date: Nov. 25, 2015

(87) PCT Pub. No.: WO2014/191813
PCT Pub. Date: Dec. 4, 2014

(65) Prior Publication Data
US 2016/0129660 A1   May 12, 2016

(30) Foreign Application Priority Data
May 29, 2013 (DE) .......................... 10 2013 009 109

(51) Int. Cl.
*F16L 59/065* (2006.01)
*B32B 3/08* (2006.01)
(Continued)

(52) U.S. Cl.
CPC .................. *B32B 3/08* (2013.01); *B32B 1/00* (2013.01); *B32B 3/26* (2013.01); *B32B 3/28* (2013.01);
(Continued)

(58) Field of Classification Search
CPC ........................... Y10T 428/231; F16L 59/065
(Continued)

(56) References Cited

FOREIGN PATENT DOCUMENTS

| JP | 2009168092 | 7/2009 |
|---|---|---|
| WO | WO 03/002828 | 1/2003 |

*Primary Examiner* — Alexander Thomas
(74) *Attorney, Agent, or Firm* — Pandiscio & Pandiscio

(57) ABSTRACT

The invention relates to a film-coated vacuum insulation panel comprising at least one inner core, at least one outer film which encloses the inner core, an inner film situated between the inner core and the outer film, and from which the outer film is raised at least in areas, preferably on all sides, by means of a shell material, the inner film and/or outer film being designed as an air-tight barrier film, wherein a) at least the inner film includes at least one ply made of an ethene-vinyl alcohol copolymer, preferably metallized, in particular having a permeation value of 0.003 cm$^3$/(m$^2$*d) or less under standard conditions (23° C., 50% external relative humidity), and b) wherein the shell material includes a drying agent which is present with a surface density of at least 100 g/m$^2$ relative to the base area of the vacuum insulation panel, and whose water vapor adsorption isotherm $\theta_{H2O}=\theta_{H2O}(p_{H2O})|_{T=23°\,C.}$ at a temperature of T=23° C. can be minimized, at least at low pressures $p_{H2O}$ below the saturation vapor pressure $p_{H2O,sat}$ at temperature T=23° C. and an atmospheric total pressure $p=p_{atm}$: $p_{H2O}<p_{H2O,sat}$ by a Langmuir curve $\theta_{H2O,L}$ according to the formula $\theta_{H2O}=\theta_{H2O}(p_{H2O})|_{T=23°\,C.}>\theta_{H2O,L}=K_L*p_{H2O}/[1+KL*p_{H2O}]$, where $p_{H2O}$ is the water vapor partial pressure and $\theta_{H2O}=q/q_{max}$ is the proportion of the water vapor absorption $q=m_{H2O}/m_{TM}$ relative to the maximum water vapor absorption capacity $q_{max}=m_{H2O,max}/m_{TM}$ of the material at temperature T=23° C., the Langmuir constant being $K_L=10^2$ bar$^{-1}$ or greater, preferably $K_L=10^3$ bar$^{-1}$ or greater, in particular $K_L=10^4$ bar$^{-1}$ or greater.

28 Claims, 2 Drawing Sheets

(51) Int. Cl.
  *E04B 1/80* (2006.01)
  *B32B 1/00* (2006.01)
  *B32B 5/16* (2006.01)
  *B32B 5/18* (2006.01)
  *B32B 15/20* (2006.01)
  *B32B 27/30* (2006.01)
  *B32B 3/26* (2006.01)
  *B32B 3/28* (2006.01)
  *B32B 7/12* (2006.01)
  *E04B 1/76* (2006.01)

(52) U.S. Cl.
  CPC ............... *B32B 5/16* (2013.01); *B32B 5/18* (2013.01); *B32B 7/12* (2013.01); *B32B 15/20* (2013.01); *B32B 27/306* (2013.01); *E04B 1/803* (2013.01); *F16L 59/065* (2013.01); B32B 2255/205 (2013.01); B32B 2262/101 (2013.01); B32B 2266/0278 (2013.01); B32B 2307/304 (2013.01); B32B 2307/308 (2013.01); B32B 2307/7242 (2013.01); B32B 2419/00 (2013.01); B32B 2509/00 (2013.01); B32B 2607/00 (2013.01); E04B 2001/7691 (2013.01); F25D 2201/14 (2013.01); Y02B 80/12 (2013.01)

(58) Field of Classification Search
  USPC .......................................................... 428/69
  See application file for complete search history.

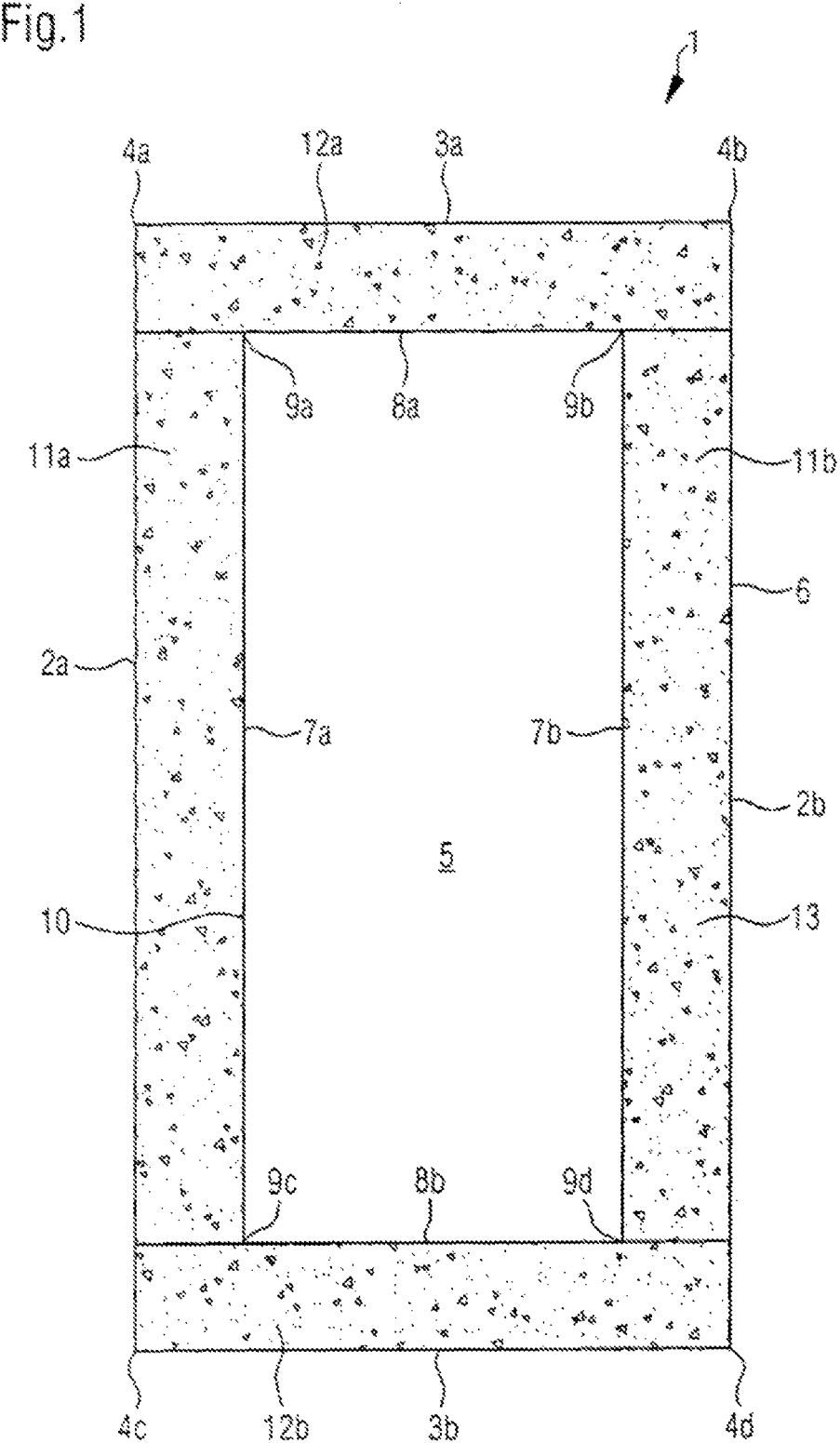

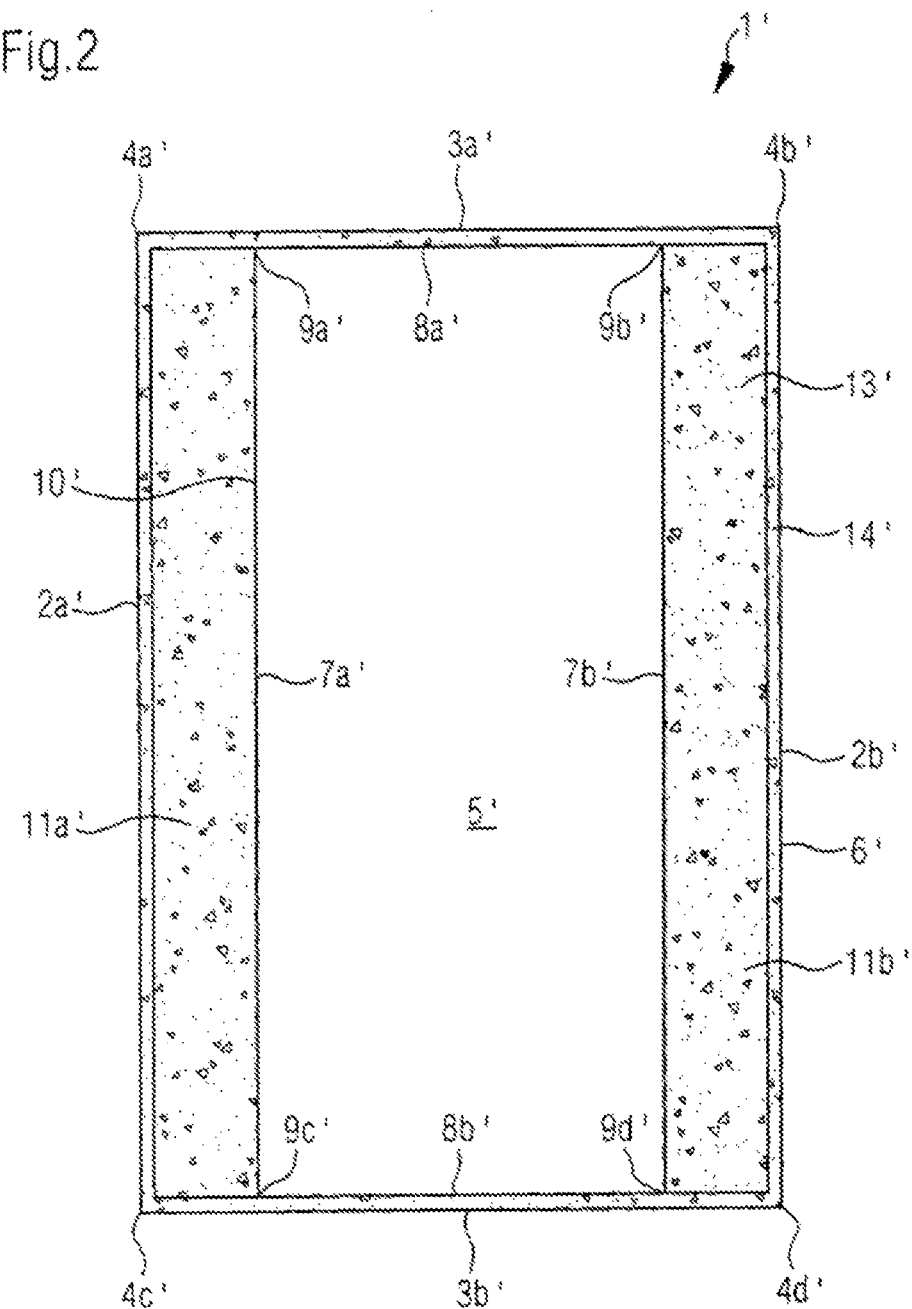

FILM-COATED VACUUM INSULATED PANEL

REFERENCE TO PENDING PRIOR PATENT APPLICATIONS

This patent application claims benefit of International (PCT) Patent Application No. PCT/IB2014/000874, filed 27 May 2014 by va-Q-tec AG for FILM-COATED VACUUM INSULATED PANEL, which claims benefit of German Patent Application No. DE 10 2013 009 109.8, filed 29 May 2013, which patent applications are hereby incorporated herein by reference.

FIELD OF THE INVENTION

The invention is directed to a film-coated vacuum insulation panel comprising at least one inner core, at least one outer film which encloses the core, an inner film situated between the inner core and the outer film, and from which the outer film is raised at least in areas, preferably on all sides, by means of a shell material, the inner film and/or outer film being designed as an air-tight barrier film.

BACKGROUND OF THE INVENTION

Evacuated insulation elements include a pressure-resistant, open-pore core having low thermal conductivity, as well as a completely enclosed covering made of a film, preferably a plastic film, which has a high barrier effect against gases and water vapor. The core is evacuated, generally to a gas pressure between 0.01 mbar and 5 mbar. As a result, the thermal conductivity of the residual gas within the porous core is reduced to a minimum. Depending on the core material, the thermal conductivity in the evacuated state is between 0.0015 and 0.010 W/mK. Common core materials are powders, open-pore foams, glass fibers, or aerogels. Foams, glass fibers, or powders are usually present in the form of a panel which is cut to the desired size, enclosed with a high-barrier film, and pumped free of air in a vacuum chamber.

A structure having an inner core and a shell enclosing same which is separated from the inner core by an inner film is described in WO 03/002828 A1.

A high-barrier film which is used may be made up of multiple film layers, composed of polyester and polyethylene, for example, laminated one on top of the other, whereby individual layers may additionally be vapor-deposited with a metallic layer to achieve a high diffusion barrier against the penetration of gases and water vapor. However, it has been found that a high-barrier film generally cannot be used to the same extent as a barrier against all types of gases or vapors; rather, it blocks certain types of gas or vapor better than others. A major problem which has not been solved thus far is the simultaneous blocking of air and its gaseous constituents such as oxygen, nitrogen, etc. on the one hand, and blocking of water vapor on the other hand.

The disadvantages of the described prior art have resulted in the task, initiated by the invention, of refining a generic vacuum insulation element in such a way that it is equally resistant to all types of gas and vapor relevant in practice, i.e., it reliably prevents penetration of same.

SUMMARY OF THE INVENTION

For a generic vacuum insulation panel, this problem is solved in that a) at least the inner film includes at least one ply made of an ethene-vinyl alcohol copolymer, preferably metallized, in particular having a permeation value of 0.003 $cm^3/(m^2 \cdot d)$ or less under standard conditions (23° C., 50% external relative humidity);

b) wherein the shell material includes a drying agent which is present with a surface density of at least 100 $g/m^2$ relative to the area of the vacuum insulation panel, and whose water vapor adsorption isotherm $\theta_{H2O} = \theta_{H2O}(p_{H2O})_{T=23°C.}$ at a temperature of T=23° C., and at low pressures $p_{H2O}$ below the saturation vapor pressure $p_{H2O,sat}$ at temperature T=23° C. and at a total air pressure p corresponding to the atmospheric total pressure $p=p_{atm}$: $p_{H2O}<p_{sat}$, can be minimized by a Langmuir curve $\theta_{H2O,L}$ according to the formula $$\theta_{H2O} = \theta_{H2O}(p_{H2O})|_{T=23°C.} \geq \theta_{H2O,L} = K_L * p_{H2O}/[1+ K_L * p_{H2O}],$$

where $p_{H2O}$ is the water vapor partial pressure and $\theta_{H2O} = q/q_{max}$ is the proportion of the water vapor absorption $q = m_{H2O}/m_{TM}$ relative to the maximum water vapor absorption capacity $q_{max} = m_{H2O,max}/m_{TM}$ of the material at temperature T=23° C. and at atmospheric total pressure $p_{atm}$, the Langmuir constant being $K_L = 10^2$ $bar^{-1}$ or greater, preferably $K_L = 10^3$ $bar^{-1}$ or greater, in particular $K_L = 10^4$ $bar^{-1}$ or greater.

By using a structure including two films which are separated from one another, at least in areas, by a shell material, on the one hand two-stage partitioning is obtained in which the inner film initially remains essentially unpressurized as long as the outer film is not penetrated by a gas or vapor. However, even if this occurs, the pressure difference at the inner film initially hardly increases, and then only gradually, due to the fact that the outer film is raised from the inner film, at least in areas, and for this reason a receiving volume is present with an initial empty space, in the areas of the shell material, which requires a comparatively large quantity of gas for filling, and which thus prevents a rapid pressure rise in the interspace. The inner film, having at least one ply made of an ethene-vinyl alcohol copolymer, may be set to different seal-tightness values for different gases and/or vapors. However, it has proven to be difficult or almost impossible to set the seal-tightness of the inner film to an equal extent for the gases in the air, i.e., nitrogen ($N_2$), oxygen ($O_2$), hydrogen ($H_2$), the noble gases such as argon (Ar), neon (Ne), helium (He), and krypton (Kr), as well as for carbon dioxide ($CO_2$) and methane ($CH_4$), in addition to water vapor ($H_2O$). Good seal-tightness against the first-mentioned gases is generally accompanied by reduced seal-tightness against water vapor. The double film structure according to the invention may advantageously be used to keep the water vapor as far away from the inner film as possible. For this purpose, on the one hand it may be provided to use a material for the outer film which has good to excellent seal-tightness specifically against water vapor. However, 100% seal-tightness cannot be achieved. The invention therefore provides, as a second measure, to adsorb water vapor, which has penetrated into the space between the two films despite all precautionary measures, using a drying agent, thus keeping the water vapor partial pressure $p_{H2O,2}$ in the interspace between the two films at low values of 1 mbar or less, for example at values of 0.5 mbar or less, preferably at values of 0.2 mbar or less, in particular at values of 0.1 mbar or less, for as long as possible, so that this low water vapor partial pressure difference $\Delta p_{H2O} = p_{H2O,2} - p_{H2O,1}$ barely drives a noticeable diffusion of water vapor molecules through the inner film, even when it has only limited seal-tightness against water vapor. However, every drying agent is not suitable for this purpose. Rather, the drying agent must be able to ensure a low water vapor partial pressure $p_{H2O}$ despite significant water absorption. The inventors have now found that this property is linked to the curve of the water vapor adsorption isotherm $\theta_{H2O} = \theta_{H2O}(p_{H2O})_{T=23°\,C.}$ at a temperature of $T=23°$ C. and at low partial pressures $p_{H2O}$ below the saturation vapor pressure $p_{H2O,sat}$: $p_{H2O} < p_{H2O,sat}$, and is linked to a much lesser extent to the absolute water vapor absorption capacity of the drying agent used. This is because the water vapor absorption capacity of a drying agent is normally expressed for a water vapor partial pressure at a humidity of 50%, i.e., $p_{H2O} = 0.5 \cdot p_{H2O,sat}$; since the latter is approximately 30 mbar at a room temperature of 23° C. and an atmospheric air pressure $p=p_{atm}$, these expressions thus typically refer to a water vapor partial pressure $p_{H2O}$ of approximately 15 mbar. However, with most drying agents the water vapor absorption capacity drops rapidly with decreasing water vapor partial pressure; i.e., at the water vapor partial pressure of approximately 1 mbar or less which is sought here, such a drying agent is hardly able to adsorb an appreciable quantity of water vapor. However, there are drying agents whose water vapor adsorption isotherm $\theta_{H2O} = \theta_{H2O}(p_{H2O})|_{T=23°\,C.}$ at a temperature of $T=23°$ C. and at low water vapor partial pressures $p_{H2O}$ below the saturation vapor pressure $p_{H2O,sat}$: $p_{H2O} < p_{H2O,sat}|_{T=23°\,C.,p=patm}$ can be minimized by a Langmuir curve $\theta_{H2O,L}$ according to the formula $\theta_{H2O} = \theta_{H2O}(p_{H2O})|_{T=23°\,C.} \geq \theta_L = K_L^* p_{H2O}/[1+K_L^* p_{H2O}]$ with a Langmuir constant $K_L = 10^2$ bar$^{-1}$ or greater, preferably with $K_L = 10^3$ bar$^{-1}$ or greater, in particular with $K_L = 10^4$ bar$^{-1}$ or greater. Although even such a curve in an ideal vacuum, i.e., with a water vapor partial pressure $p_{H2O}=0$, has a zero point, i.e., the water vapor absorption capacity approaches zero at that point, even in a finite vacuum, i.e., in which $p_{H2O} \approx 0$ but $p_{H2O} > 0$, the Langmuir curve $\theta_{H2O,L}$, and thus also the actual water vapor adsorption isotherm minimized by that ideal curve, rises steeply, namely, with a slope $K_L \geq 100$ bar$^{-1}$ or with a slope $K_L \geq 1,000$ bar$^{-1}$, or even with a slope $K_L \geq 10,000$ bar$^{-1}$. Since the relative loading $\theta_{H2O}$ of the drying agent, which is defined as the actual loading q, relative to the maximum water absorption capacity $q_{max}$, the relative loading can assume a maximum value of 1. For a constant slope of $K_L=10,000$ bar$^{-1}$, this value would already be reached at a water vapor partial pressure $p_{H2O}=0.1$ mbar: $\theta_{H2O} = K_L^* p_{H2O} = 10,000$ bar$^{-1}$*0.1 mbar=1. However, the actual progression of the Langmuir curve $\theta_{H2O,L}$ flattens, and at $p_{H2O}=0.1$ mbar only reaches a value of $\theta_{H2O} = K_L^* p_{H2O}/[1+K_L^* p_{H2O}] = 10,000$ bar$^1$*0.1 mbar/[1+ 10,000 bar$^{-1}$*0.1 mbar]=1/[1+1]=0.5. However, this still means that the effective water vapor absorption capacity, at a sought water vapor partial pressure $p_{H2O}=0.1$ mbar, is already 50% of the maximum water vapor absorption capacity $q_{max}$. Thus, if the maximum water vapor absorption capacity $q_{max} = m_{H2O,max}/m_{TM} = 0.2$, i.e., the drying agent can absorb a maximum of 20% of its own weight, or its dry mass $m_{TM}$, in water, i.e., a water quantity $m_{H2O,max} = 0.2 \cdot m_{TM}$, the effective water absorption q at a water vapor partial pressure $p_{H2O}=0.1$ mbar is 10% of the drying agent's own weight $m_{TM}$ in the dry state. Therefore, for a surface density of 100 g/m$^2$ of the drying agent, this would be a quantity of 10 g/m$^2$. This means that such a drying agent could absorb 10 g water per square meter of the vacuum insulation panel at a temperature of 23° C. without the water vapor partial pressure rising above a value of 0.1 mbar within the interspace between the two films.

As long as the water absorption in the drying agent, at a temperature of 23° C., does not increase above a value of 10% of the drying agent's own weight in the dry state, according to the invention the water vapor partial pressure within the interspace between the two films remains at a value of 0.1 mbar or less. This criterion may likewise be used for distinguishing between drying agents which are suitable for the invention, and drying agents which do not satisfy this relationship, which are not suitable.

The Langmuir curve $\theta_{H2O,L} = K_L^* p_{H2O}/[1+K_L^* p_{H2O}]$ results from the following consideration:

On its (inner) surface the drying agent in question has potential, empty addition sites (S*) as well as addition sites (SP) that are filled with particles, i.e., water vapor molecules. Furthermore, there are a number of particles or water vapor molecules in the gas volume (P). The number of filled addition sites (SP) is proportional to the loading $\theta_{H2O}$ of the drying agent with $H_2O$ molecules, the number of empty addition sites (S*) is proportional to $1-\theta_{H2O}$, and the number of water vapor molecules (P) in the gas volume is proportional to the water vapor partial pressure $p_{H2O}$. If the concentrations [S*]=c(S*), [SP]=c(SP), and [P]=c(P) are considered, for a constant temperature T, for example at $T=23°$ C., the following equilibrium constant $K_L$ may be calculated:

$$K_L = [SP]/[S^*][P],$$

and use of the above relationships results in the following expression:

$$K_L = \theta_{H2O}/[(1-\theta_{H2O})^* p_{H2O}].$$

This expression may be transformed as follows:

$$\theta_{H2O} = K_L^*[(1-\theta_{H2O})^* p_{H2O}],$$

$$\theta_{H2O}[1+K_L^* p_{H2O}] = K_L^* p_{H2O},$$

$$\theta_{H2O} = K_L^* p_{H2O}/[1+K_L^* p_{H2O}].$$

This means that the Langmuir constant $K_L$ is actually the equilibrium constant for the "reaction"

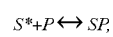

which proceeds in both directions at different rates. The larger $K_L$, the more strongly the adsorption predominates over the desorption. Accordingly, the parameter $K_L$, which is characteristic for the invention, is a measure of the tendency or affinity of the drying agent to fill the potentially loadable sites, for example in the interior of the drying agent, with water molecules, also and in particular when the water molecules are present only in a small quantity, i.e., at low partial pressures. In contrast, the maximum water absorption capacity $q_{max}$, frequently stated for drying agents, is a criterion for the number of potentially loadable sites of a drying agent, but provides no information concerning the tendency with which the drying agent in question also in fact seeks to actually fill these loadable sites that are present.

Since $K_L = [SP]/[S^*][P]$, the Langmuir constant $K_L$ also determines the free enthalpy or Gibbs energy $\Delta G$ at $T=23°$, according to the following formula:

$$\Delta G = \Delta G° + RT^* \ln K_L,$$

where
$R=8.314472(15)$ J mol$^{-1}$K$^{-1}$ is the universal gas constant, and T is the absolute temperature in Kelvin, in particular $T=296.15$ Kelvin.

However, the above equation is not a chemical reaction in the strict sense, since the attachment of water molecules to the (inner) surface of the drying agent is generally not accompanied by a chemical change; however, in addition to the physisorption there is also chemisorption.

The phrase "$\theta_{H2O,L}$ minimizes $\theta_{H2O}$" used above is to be understood in the sense that the actual water vapor loading curve or water vapor adsorption isotherm $\theta_{H2O}$ in the definition range T=23° C., $p_{H2O}<p_{H2O,sat}$ under consideration never goes below the ideal Langmuir curve $\theta_{H2O,L}$, but, rather, is at least greater than or equal to same:

$$\theta_{H2O}|_{T=23° C.} \geq \theta_{H2O,L} \text{ for } 0 \leq p_{H2O} \leq p_{H2O,sat}.$$

It has proven to be advantageous that at a temperature T=23° C., the drying agent used in the shell material, relative to the drying agent's own dry weight or the drying agent's own dry mass $m_{TM}$, has a maximum water vapor absorption capacity $q_{max}=m_{H2O,max}/m_{TM}$ of 0.1 or greater: $q_{max}=m_{H2O,max}/m_{TM} \geq 0.1$; for example, a maximum water vapor absorption capacity $q_{max}=m_{H2O,max}/m_{TM}$ of 0.2 or greater: $q_{max}=m_{H2O,max}/m_{TM} \geq 0.2$; preferably a maximum water vapor absorption capacity $q_{max}=m_{H2O,max}/m_{TM}$ of 0.3 or greater: $q_{max}=m_{H2O,max}/m_{TM} \geq 0.3$; in particular a maximum water vapor absorption capacity $q_{max}=m_{H2O,max}/m_{TM}$ of 0.4 or greater: $q_{max}=m_{H2O,max}/m_{TM} \geq 0.4$. This involves the greatest water vapor absorption capacity that is possible at the saturation vapor pressure under standard conditions, i.e., at T=23° C. and an atmospheric air pressure $p=p_{atm}$.

In addition, the invention proposes that at a temperature T=23° C. and a humidity of 2%, relative to the saturation vapor pressure $p_{H2O,sat}$ under standard conditions (T=23° C., 50% relative humidity): $p_{H2O}=0.01*p_{H2O,sat}$, relative to the drying agent's own dry weight or the drying agent's own dry mass $m_{TM}$ the drying agent has a water vapor absorption capacity $q=m_{H2O}/m_{TM}$ of 0.05 or greater: $q=m_{H2O}/m_{TM} \geq 0.05$; for example, a water vapor absorption capacity $q=m_{H2O}/m_{TM}$ of 0.1 or greater: $q=m_{H2O}/m_{TM} \geq 0.1$; preferably a water vapor absorption capacity $q=m_{H2O}/m_{TM}$ of 0.15 or greater: $q=m_{H2O}/m_{TM} \geq 0.15$; in particular a water vapor absorption capacity $q=m_{H2O}/m_{TM}$ of 0.2 or greater: $q=m_{H2O}/m_{TM} > 0.2$. This value is based on a reduced water vapor partial pressure, with standard conditions of T=23° C. and 50% relative humidity. This corresponds, relative to the absolute saturation vapor pressure $p_{H2O,sat}$ (corresponding to 100% humidity), to a value of only 1%: $p_{H2O}=0.01*p_{H2O,sat}$.

The invention further provides that the inner film and the outer film have different layer structures, and/or differ from one another in a different composition of at least one ply. It is thus possible to optimize each of the two films for seal-tightness against different gases and/or vapors.

It has proven to be advantageous that the space within the inner film is evacuated to a residual pressure $p_1$, generally to a residual pressure of 5 mbar or less, optionally to a residual pressure of 2 mbar or less, for example to a residual pressure of 1 mbar or less, preferably to a residual pressure of 0.5 mbar or less, more preferably to a residual pressure of 0.2 mbar or less, in particular to a residual pressure of 0.1 mbar or less. The pressure here should be as low as possible, since the best thermal insulation properties are thus achieved. The above-mentioned pressure range represents a reasonable compromise between optimal thermal insulation on the one hand and low manufacturing costs on the other hand.

In addition, the space between the inner film and the outer film should be evacuated to a residual pressure $p_2$, generally to a residual pressure of 100 mbar or less, optionally to a residual pressure of 50 mbar or less, for example to a residual pressure of 20 mbar or less, preferably to a residual pressure of 10 mbar or less, more preferably to a residual pressure of 5 mbar or less, in particular to a residual pressure of 2 mbar or less. Although this space further increases the overall insulation, its primary function is to protect the inner core space from a pressure rise, in particular by eliminating the differential pressure from the inner film to the greatest extent possible. This space is best able to fulfill this function when it is likewise evacuated.

The invention further provides that the space within the inner film is evacuated to a lower residual pressure $p_1$ than the residual pressure $p_2$ in the space between the outer film and the inner film:

$$p_1 < p_2.$$

This measure ensures that the inner film cannot be lifted off from the inner core by a negative pressure difference; rather, at least due to its internal stress the inner film always rests against the core. Uncontrolled states are thus avoided.

On the other hand, the space between the outer film and the inner film should be evacuated to approximately the same residual pressure $p_2$ as the residual pressure $p_1$ in the space within the inner film, i.e., preferably evacuated to an absolute pressure difference of 1 mbar or less: $|\Delta p|=|p_1-p_2| \leq 10$ mbar, preferably: $|\Delta p|=|p_1-p_2| \leq 5$ mbar, preferably: $|\Delta p|=|p_1-p_2| \leq 2$ mbar, in particular: $|\Delta p|=|p_1-p_2| \leq 1$ mbar.

As a result, there is only a minimal pressure drop at the inner film, which, in view of the good barrier effect which is present anyway, results in no appreciable diffusion from the film interspace into the inner core space. Only when the pressure in the film interspace has greatly increased will discernible diffusion, albeit gradual, take place from that location into the inner core space, which, however, cannot be greater than the diffusion from the surroundings into the film interspace. It must therefore be assumed that the double film layer results at least in a doubling of the useful life of this type of vacuum insulation element, possibly even in an even greater increase in its useful life.

Further advantages may be achieved in that a filler material of the core and/or of the shell is made of a pressure-resistant, porous, preferably open-pore material having low thermal conductivity, and/or a drying agent; a getter material may also be contained therein. A substance that is able to absorb moisture, in particular water vapor, and thus lower the vapor pressure is regarded as a drying agent. Preferred materials are able to incorporate the absorbed moisture, optionally with a change in the chemical and/or physical structure. Provided that a material having the properties of a drying agent is also pressure-resistant and porous, in particular open-pored, it may be used in the pure form if necessary. On the other hand, use of a mixture of both substances is recommended.

According to the invention, a powder, a foam, or glass fibers is/are preferred as the pressure-resistant, porous material. Such substances combine the properties of sufficient pressure resistance with a particularly high pore fraction. Open-pore polyurethane foam is suitable, a plastic which is characterized by the urethane group —NH—CO—O—, in particular as a component of the monomer which forms the main chain.

According to the invention, hygroscopic materials which are able to absorb moisture from the surroundings and to bind, in particular incorporate it are recommended as drying agent. Hygroscopic substances which preferably release water molecules with difficulty once they have been absorbed, for example because the molecular structure of the substances changes due to the water absorption, appear to be particularly suited for the present application. Provided that the absorbed water is once again released at an elevated temperature, this should be only at temperatures of normal usage, i.e., preferably above 60° C., in particular above 80° C.

However, some hygroscopic substances, in particular plant or animal materials such as wood or wool, appear to be less suited, since they are not able to permanently retain the absorbed moisture. This may also include many inorganic substances, in particular when the incorporation is not accompanied by a change in structure. In this regard, xerogels must certainly be mentioned, in particular silica gel, i.e., amorphous silica, having the empirical formula $SiO_2$. This is a porous body which is able to absorb one- to two-thirds of its weight in water, which, however, may be incorporated into its pores only at high humidity; even at a moderate humidity this value falls far short, and at low humidity, water is even released.

In this regard, zeolites, i.e., materials from a substance group with the following composition, appear to be better suited:

$$M^{n+}{}_{x/n}[(AlO_2)^-{}_x(SiO_2)_y].zH_2O,$$

where M is typically a cation of an alkali metal or alkaline earth metal with the charge factor n; for reasons of electrical neutrality of the overall substance, its proportion corresponds to the 1/nth portion of the negatively charged aluminum oxide tetrahedron.

The structure comprises a structure made up of $AlO_4^-$ and $SiO_4$ tetrahedrons; oxygen atoms establish the connection between aluminum atoms and silicon atoms, whereby micropores result in which water molecules may be incorporated. The factor z indicates how much water has already been incorporated into the pores of the crystal.

Calcium oxide (CaO) also has advantageous properties for the invention.

In the filler material of the core within the inner film, the volume ratio of drying agent to pressure-resistant, porous material should be 1:1 or less, generally 1:2 or less, for example 1:3 or less, optionally 1:4 or less, preferably 1:5 or less, more preferably 1:7 or less, in particular 1:10 or less. In the core of the vacuum insulation element according to the invention, thermal insulation which lasts for as long as possible is of primary importance. Therefore, particularly high thermal insulation properties, i.e., a particularly pronounced porosity, among other factors, are paramount.

In contrast, one of the most important functions of the outer chamber or the shell is to preferably permanently keep gas pressure, in particular also vapor pressure, from the inner film above the chamber or the core. To achieve this, it is further provided that the interspace between the inner film and the outer film [the volume ratio] is filled, at least in areas, by a filler material in which a drying agent and/or a pressure-resistant, porous material is contained, generally in a volume ratio of 1:2 or greater, optionally in a volume ratio of 1:1 or greater, for example in a volume ratio of 2:1 or greater, optionally in a volume ratio of 3:1 or greater, preferably in a volume ratio of 5:1 or greater, more preferably in a volume ratio of 7:1 or greater, in particular in a volume ratio of 9:1 or greater. If, despite all countermeasures, water vapor should penetrate into the outer chamber or shell, at this location it is absorbed by the drying agent until the latter is saturated, so that the vapor pressure initially remains at an extremely low level, even if water vapor gradually diffuses through the outer film. The vapor pressure in the shell does not rise until the water absorption capacity of the drying agent is depleted, as the result of which the vapor differential pressure between the outer chamber and the inner chamber, or between the shell and the core, correspondingly increases, and a slight diffusion through the inner film also gradually takes place, but with an extreme time delay, in the ideal case, with a delay of decades.

The inner core may be preformed, in particular approximately corresponding to the desired shape of the overall vacuum insulation panel. Regardless of whether the core material is preformed, or is not formed until after the inner film is filled, for example inside a press, the core together with its inner coating should be initially produced, preferably completely produced, including evacuation, before the shell together with the outer covering is produced.

Since the outer covering is raised, at least in areas, from the core which is enclosed by the inner film, the shape of the finished vacuum panel differs from the shape of the core. According to the invention, it is therefore recommended that the shape of the core is an approximately scaled-down shape of the overall vacuum insulation panel.

It is within the scope of the invention that the core material has a cuboidal shape, in particular a panel shape, with two mutually parallel base areas as well as two longitudinal sides and two end-face sides.

This corresponds to a particularly important application of the invention, namely, panel-shaped vacuum insulation elements. These may be universally used for thermal insulation, for example for thermally insulating house walls and/or roofs, as well as for thermally insulating refrigerators or coolers. While flat panel shapes are preferred, there are also applications for curved panels, for example in the shape of cylindrically curved panels for insulating pipes, (cooking) pots, (coffee) cans, etc. These applications share the common feature that two comparatively large base areas are present which extend at an approximately constant distance from one another. These two base areas are joined together along one edge. This edge may have an approximately constant width.

Within the scope of a first embodiment, the shell enclosing the core may have an approximately constant thickness, in that the film surrounding the core is covered by filler material on all sides.

The manufacturing process may thus be simplified significantly due to the fact that spacer plates, for example, may be provided between the two films as shell filler material, and a strip-shaped filler material could be inserted along the edge as a spacer. Prefabricated plate- or strip-shaped filler material could be adhered, for example to the outside surface of the inner film during manufacture, in particular, of course, after production of the core which is enclosed by the film.

On the other hand, it is also possible, in particular for a (flat or curved) vacuum insulation panel, for the shell in the region of the base areas to have, for example, a constant first thickness, and in the region of the edge which joins the base areas together, to have a different, preferably smaller, thickness.

For the function of the invention, for a panel-shaped (flat or curved) insulation element it is not absolutely necessary for a filler material of the outer shell to completely enclose the inner film. Rather, it would suffice, for example, for one or preferably both base areas of the core, which is enclosed for the first time, to be covered with a spacer material when it is ensured in some other way that the two cover films are separated at a distance from one another, preferably on all sides.

This could be brought about, for example, by winding a nonwoven fabric or some other flexible, porous material around the core, which is enclosed for the first time and preferably already evacuated, optionally directly onto the inner covering or around the enclosed core together with a spacer plate or some type of filler material applied thereto. Thus, for example, initially one or more spacer plates or strips made of a suitable filler material could be adhered to the inner cover film of the core, and this unit could then be enclosed in a nonwoven fabric or some other flexible, porous material before the outer covering is ultimately applied. In such a method, if the end-face or edge surfaces are enveloped only by a nonwoven fabric or the like, an optionally reduced thermal insulation property of the cover material of the shell, which covers only the base area(s), is not critical, and will not diminish the overall insulating value of the vacuum insulation panel, and in particular will not cause heat bridges.

The inner film is preferably designed as an air-tight barrier film, for example as a multilayer film with at least one ply made of a copolymer of ethene and vinyl alcohol, preferably metallized. As the preferred main property, this film should in particular be air-tight, i.e., gas-tight, in order to keep the core area, as the actual thermal insulation layer, preferably completely free of pressure.

If this property has priority over the vapor-tightness of the inner covering, this would appear to be tolerable when the outer covering for this purpose is designed with preferably a vapor-tight design. Therefore, according to the invention it is recommended that the outer film is designed as an air- and/or vapor-tight barrier film, for example as a multilayer film with at least one ply made of a copolymer of ethene and vinyl alcohol, preferably metallized, i.e., provided on at least one side with a thin, preferably vapor-deposited metal layer.

Although according to the invention, a material or at least one ply made of a copolymer of ethene and vinyl alcohol is preferred for the inner covering as well as for the outer covering, this does not necessarily mean that exactly the same material should be used in both cases. This is because films made of a copolymer of ethene and vinyl alcohol may have different seal-tightness properties, depending on the setting of the proportion ratio of the ethene and vinyl alcohol. With the monomers ethene ($C_2H_4$) and vinyl alcohol ($C_2H_4O$), copolymers may be produced in different mass ratios; however, the polymerization takes place not from the monomers themselves, but, rather, preferably using ethene and vinyl acetate, with the acetyl group being subsequently removed by hydrolysis. The potential variance of the resulting copolymer is due to the fact, among other factors, that in the polymerization the sequence of the monomer groups in the macromolecule is not fixed, but instead is arbitrarily set, i.e., randomly, or in any event in the frequency probability corresponding to the mixture ratio of the starting products. It is precisely this degree of freedom that allows the properties of the finished product to be influenced. In practice, the ethene portion is usually between approximately 20 mol-% and 50 mol-%; i.e., the portion of the ethene monomers in a macromolecule of the copolymer is between approximately 20% and 50% of all involved monomers of the macromolecule. Although a larger portion of the vinyl alcohol results in a greater barrier effect against gases, the hygroscopic properties of the copolymer, which are present anyway, also increase, and on the one hand the barrier effect against water vapor thus decreases, and on the other hand, with increasing saturation with water vapor, the barrier effect against gases also decreases.

In other words, although with a small ethene portion of 20 to 25 mol-%, for example, the copolymer has a gas permeability of only approximately 0.05 $cm^3/(m^2*d*bar)$, it has a water vapor permeability of approximately 5 g ($m^2*d$). In contrast, if the ethene portion is maximized to 45 to 50 mol-%, for example, although the water vapor permeability decreases to approximately 0.5 $g/(m^2*d)$, i.e., to approximately one-tenth the value for a low ethene portion, on the other hand the gas permeability increases to approximately 0.5 $cm^3/(m^2*d*bar)$, i.e., to a value approximately ten times that of the variant with a low ethene portion.

In view of these relationships, according to the invention it is proposed to optimize the outer film with regard to a low water vapor permeability, and thus to use a copolymer with ethene and vinyl alcohol monomers in the outer film, whereby the portion of the ethene monomers should be 30 mol-% or greater, preferably 35 mol-% or greater, in particular 40 mol-% or greater. Vapor which still permeates is temporarily bound in the shell space between the two films and thus neutralized, so that the vapor pressure within this interspace, and thus the vapor differential pressure above the inner film, temporarily remains negligibly low.

Thus, the inner film for a low gas permeability may be optimized by using a film with at least one ply made of a copolymer of ethene and vinyl alcohol monomers in the inner film, whereby the portion of the ethene monomers should be 40 mol-% or less, preferably 35 mol-% or less, in particular 30 mol-% or less.

A particularly high density value may be achieved when the outer film is made, at least partially, of aluminum or is at least partially covered with aluminum. A pure aluminum film is superior to a metallized high-barrier film with regard to the seal-tightness, and is therefore generally preferred, apart from the price-performance ratio.

However, the increased metal cross section of a pure aluminum film in the region of the edge sides may result in heat bridges. For this reason, the use of pure aluminum films may possibly be limited to the base areas of a panel-shaped vacuum insulation element by providing the outer film with an aluminum ply (only) on two oppositely situated surfaces.

The inner film should be completely folded onto the inner core, so that the shape of the vacuum insulation panel may be made congruent with the shape of the core. Protruding welding tabs should thus be turned down prior to inserting the enclosed core into the outer film and/or prior to provision with the shell material.

Lastly, according to the teaching of the invention, five fold lines of the inner film converge at each corner of the inner core. When the welding tabs are folded down, it is important not to stress the film in question, since in such a case a nontight location would be produced, thus negating all other efforts to create a seal-tight, and thus durable, vacuum insulation element. For these reasons, all folding operations for the film, whether before or after the evacuation, should be carried out with as little stress as possible. This means that a folding plan should be followed, whereby the film in any event is theoretically spared from any stretching. This requires, in particular at the corners, that five fold lines converge at the corners in each case, so that the excess film area at that location may be folded onto the core in an ordered manner.

BRIEF DESCRIPTION OF THE DRAWINGS

Further features, particulars, advantages, and effects based on the invention result from the following description of several preferred embodiments of the invention, and with reference to the drawings, which show the following:

FIG. 1 shows a vacuum insulation panel according to the invention according to a first embodiment of the invention in a cross section; and FIG. 2 shows another embodiment of a vacuum insulation panel according to the invention in an illustration corresponding to FIG. 1.

DETAILED DESCRIPTION OF THE PREFERRED EMBODIMENT

The vacuum insulation element 1 from FIG. 1 has a panel-shaped geometry with two flat, mutually parallel base areas 2a, 2b. These two base areas 2a, 2b have identical surface areas $F_V$ and are congruent with one another, and in particular are each rectangular and each have the same perimeter $U_V$. Therefore, the flat edge surfaces which connect the base areas, of which only two are apparent in the sectional illustration according to FIG. 1, namely, the edge surfaces 3a, 3b, each extend in pairs in parallel to one another, as is apparent at the edge surfaces 3a, 3b in FIG. 1. In addition, the base surfaces and edge surfaces 2a, 2b, 3a, 3b merge into one another via edges 4a, 4b, 4c, 4d, which are right-angled in each case.

Although the vacuum insulation element 1 contains a core 5 in its interior, the core only indirectly determines the outer shape of the vacuum insulation element. This is because the core does not directly support an outer covering 6 which delimits the vacuum insulation element 1 as its surface.

The core 5 has a cuboidal, panel-shaped form with two flat, mutually parallel, in particular rectangular, base areas 7a, 7b of identical surface area $F_K$ which are congruent with one another and joined together by flat edge surfaces, in particular by four flat edge surfaces, of which only two are apparent in the sectional illustration according to FIG. 1, namely, the edge surfaces 8a, 8b; in each case two edge surfaces 8a, 8b are parallel to one another in pairs. The base surfaces and edge surfaces 7a, 7b, 8a, 8b merge into one another via edges 9a, 9b, 9c, 9d, which are right-angled in each case.

As is apparent from FIG. 1, although the base areas 2a, 7a; 2b, 7b and the edge surfaces 3a, 8a; 3b, 8b of the vacuum insulation element 1 and of the core 5, respectively, correspond to one another, the surface area $F_K$ of the base surfaces and edge surfaces 7a, 7b, 8a, 8b of the core 5 is smaller than the surface area $F_V$ of the base surfaces and edge surfaces 2a, 2b, 3a, 3b of the overall vacuum insulation element 1, and in particular, in each case by a differential value $\Delta F = F_V - F_K$.

The expression $\Delta F = d*(U_V + U_K)/2$ is a valid approximation for the differential value $\Delta F$, where d corresponds to the average distance between a surface 7a, 7b, 8a, 8b of the core 5 and the closest surface 2a, 2b, 3a, 3b of the vacuum insulation element 1 parallel thereto. This average distance d is in the range of several millimeters to a few centimeters, and is therefore much greater than the thickness $d_a$ of the outer film cover 6:

$d >> d_a$, preferably $d > 10 * d_a$, in particular $d > 50 * d_a$.

The core 5 is preferably made of pyrogenic silicic acid; however, a core 5 made of polyurethane or some other porous, in particular open-pore, material would be conceivable.

The core 5 is directly enclosed by an inner film 10 which is designed as a high-barrier film, and which is sealed air-tight around the core 5 under vacuum.

This inner assembly made up of the core 5 and the inner cover film 10 may be produced in various ways. A pocket that is open on one side could optionally initially be formed from one or two film cuttings, and the core 5 could then be inserted into this pocket; lastly, the side still remaining would be welded under vacuum.

On the other hand, a loose powder of the core material could be filled into a pocket which is made of the cover film 10 and open on one side, and brought into the desired shape under vacuum only after the final sealing, by means of an external pressure; in this method, it would also be possible in particular to impart a wide variety of shapes to the core 5, for example a panel-shaped but curved form, which is advantageous for thermally insulating pipes or the like, or virtually any other shapes.

Another possible manufacturing method would be to dispense with the preforming of a pocket, and to wrap a preformed, for example panel-shaped, core 5 on the shell side, i.e., along the two base areas 7a, 7b and two edge surfaces 8a, 8b of the core. The film 10 in its overlap area could then be welded, under tight tension, into a type of close-fitting tube, so that only two oppositely situated edge faces or end faces are not closed off.

At that location, the film still initially protruding could be folded up without stress and folded onto the core 5. This is possible particular due to an ordered folding, with a total of five fold lines converging at each corner of the core 5.

After appropriate folding, the originally protruding end areas of the cover film 10 which are now folded onto one another may be welded together. The resulting welded sheet may then likewise be folded onto the core 5 without stress, so that the inner assembly made up of the core 5 and the inner cover film 10 may be regarded in a good approximation as cuboidal and plate-shaped, corresponding to the original shape of the core 5.

The high-barrier film 10 used may have one or more plies made of an ethene-vinyl alcohol copolymer, whereby the material portion of the ethene in the copolymer should be 35 mol-% or less.

The inner assembly is evacuated, preferably to a residual pressure $p_1$ of 0.5 mbar or less.

A panel 11a, 11b which is congruent with each of the base areas 7a, 7b in question is then applied to each of the two base areas 7a, 7b of the core 5 on the inner cover film 10 and preferably fixed, for example adhesively, in particular by means of one or more adhesion points, lines, or areas. These panels 11a, 11b each have a thickness d and a surface area $F_K$.

A total of four additional panels, of which only two panels 12a, 12b are depicted in FIG. 1, are then fixed along the four edge surfaces 8a, 8b, not yet covered by panels 11a, 11b, of the core 5 covered by the inner cover film 10. The panels 12a, 12b likewise have a thickness d, and in each case have a larger surface area than the edge surfaces 8a, 8b in question. The overhang should be dimensioned in such a way that the external shape of the core 5 covered by all six panels 11a, 11b, 12a, 12b once again has a cuboidal, panel-shaped form, but now with the dimensions of the finished vacuum insulation element 1.

The panels 12a, 12b may also be fixed, for example adhesively, to the inner cover film 10 at the edge surfaces 8a, 8b.

The six panels 11a, 11b, 12a, 12b are preferably made of a hygroscopic material, for example zeolite. Altogether, they form the subsequent shell 13 which encloses the core 5.

After the shell 13 has acquired its shape in this way, this assembly comprising the core 5, inner covering 10, and shell 13, which is already completed with regard to the shape of the finished vacuum insulation element 1, is now enclosed by the outer covering 6.

This may selectively take place by insertion into a preformed pocket of the cover film 6, or by folding into a film cutting, followed by welding the mutually overlapping film areas in a tightened state on the shell side, subsequent stress-free folding of the film areas, protruding at the end-face side, onto one another, and lastly, likewise welding the film edges abutting one another at that location.

Before completely welding the outer film, the shell area 13 enclosed by same is likewise evacuated, in particular to a residual pressure $p_2$ between 0.5 mbar and 1 mbar, so that preferably the remaining residual pressure $p_1$ in the area of the core 5 is not greater than the remaining residual pressure $p_2$ in the area of the shell 13.

For the outer covering 6, a high-barrier film is likewise used, preferably made of multiple plies, in particular with at least one ply made of an ethene-vinyl alcohol copolymer, whereby the material portion of the ethene in the copolymer should be 35 mol-% or greater.

The vacuum insulation element 1' from FIG. 2 differs from the vacuum insulation element 1 according to FIG. 1 primarily in the area of the shell 13, while the core 5', the outer film 6', and the inner film 10' may be identical to the first vacuum insulation element 1.

After the inner assembly comprising the core 5' and inner film 10' has been produced according to the method described for the vacuum insulation element 1, the two base areas 7a', 7b' are each covered with a panel 11a', 11b' of thickness d, made of zeolite or some other filler material, preferably having hygroscopic properties, at least in part; these panels 11a', 11b' may be fixed to the inner film 10', for example adhesively, which, however, is not absolutely necessary in the manufacture of the vacuum insulation element 1'.

Instead of now also covering the edge surfaces 8a', 8b' with panels of a filler material, the entire inner assembly together with the panels 11a', 11b' is enclosed by a nonwoven fabric 14 having porous, flexible properties.

After this has taken place, the outer film 6' is applied as previously described for the vacuum insulation element 1, and after evacuation and complete sealing of the outer film 6', the vacuum insulation element 1' is finished.

The vacuum insulation element 1' has good properties comparable to the vacuum insulation element 1, in particular since the same materials are used for the core 5', panels 11a', 11b', inner film 10', and outer film 6'.

However, the thermal insulation properties may possibly be even better, since the panels 12a, 12b, which may have poorer thermal insulation properties than the core 5', are dispensed with at the edges.

LIST OF REFERENCE NUMERALS

1 Vacuum insulation element
2 Base area
3 Edge surface
4 Edge
5 Inner core
6 Outer covering
7 Base area
8 Edge surface
9 Edge
10 Inner covering
11 Porous support material
12 Porous support material
13 Porous support material
14 Nonwoven fabric

The invention claimed is:

1. A film-coated vacuum insulation panel (1; 1') comprising at least one inner core, at least one outer film which encloses the core, an inner film (10; 10') situated between the inner core (5; 5') and the outer film (6; 6'), and from which the outer film (6; 6') is raised at least in areas or on all sides, by means of a shell material (13; 13'), wherein at least one of the inner film and the outer film (6, 10; 6', 10') are designed as an air-tight barrier film, characterized in that
   a) at least the inner film (10; 10') includes at least one ply made of an ethene-vinyl alcohol copolymer, or of a metallized ethene-vinyl alcohol copolymer, or of an ethene-vinyl alcohol copolymer having a permeation value of 0.003 cm$^3$/(m$^2$*d) or less under standard conditions (23° C., 50% external relative humidity),
   b) wherein the shell material includes a drying agent which is present with a surface density of at least 100 g/m$^2$ relative to the base area of the vacuum insulation panel (1; 1'), and whose water vapor adsorption isotherm $\theta_{H2O}=\theta_{H2O}(p_{H2O})|_{T=23°\ C.}$ at a temperature of T=23° C. can be minimized, at least at low pressures $p_{H2O}$ below the saturation vapor pressure $p_{H2O,sat}$ at standard conditions (at a temperature T=23° C. and at atmospheric total pressure $p=p_{atm}=1013$ mbar): $p_{H2O}<P_{H2O,sat}$, by a Langmuir curve $\theta_{H2O,L}$ according to the formula $$\theta_{H2O}=\theta_{H2O}(p_{H2O})|_{T=23°\ C.}\geq\theta_{H2O,L}=K_L*p_{H2O}/[1+K_L*p_{H2O}],$$

where $p_{H2O}$ is the water vapor partial pressure and $\theta_{H2O}=q/q_{max}$ is the proportion of the water vapor absorption $q=m_{H2O}/m_{TM}$ relative to the maximum water vapor absorption capacity $q_{max}=m_{H2O,max}/m_{TM}$ of the material at temperature T=23° C., wherein the Langmuir constant is $K_L=10^2$ bar$^{-1}$ or greater, or $K_L=10^3$ bar$^{-1}$ or greater, or $K_L=10^4$ bar$^{-1}$ or greater.

2. The vacuum insulation element (1; 1') according to claim 1, characterized in that at a temperature T=23° C., the drying, relative to the drying agent's own dry weight or the drying agent's own dry mass $m_{TM}$, has a maximum water vapor absorption capacity $q_{max}=m_{H2O,max}/m_{TM}$ of 0.1 or greater: $q_{max}=m_{H2O,max}/M_{TM}\geq0.1$; or a maximum water vapor absorption capacity $q_{max}=m_{H2O,max}/m_{TM}$ of 0.2 or greater: $q_{max}=m_{H2O,max}/m_{TM}\geq0.2$; or a maximum water vapor absorption capacity $q_{max}=m_{H2O,max}/m_{TM}$ of 0.3 or greater: $q_{max}=m_{H2O,max}/m_{TM}\geq0.3$; or a maximum water vapor absorption capacity $q_{max}=m_{H2O,max}/m_{TM}$ of 0.4 or greater: $q_{max}=m_{H2O,max}/m_{TM}\geq0.4$.

3. The vacuum insulation element (1; 1') according to claim 1, characterized in that at a temperature T=23° C. and a vapor pressure p of at least 1% of the saturation vapor pressure $p_{sat}$: $p>0.01*p_{sat}$, relative to the drying agent's own dry weight or the drying agent's own dry mass $m_{TM}$, the drying agent has a maximum water vapor absorption capacity $q_{max}=m_{H2O,max}/m_{TM}$ of 0.05 or greater: $q_{max}=m_{H2O,max}/m_{TM}\geq0.05$; or a maximum water vapor absorption capacity $q_{max}=m_{H2O,max}/m_{TM}$ of 0.1 or greater: $q_{max}=m_{H2O}/m_{TM}\geq0.1$; or a maximum water vapor absorption capacity $q_{max}=m_{H2O,max}/m_{TM}$ of 0.15 or greater: $q_{max}=m_{H2O,max}/m_{TM}\geq0.15$; or a maximum water vapor absorption capacity $q_{max}=m_{H2O,max}/m_{TM}$ of 0.2 or greater: $q_{max}=m_{H2O,max}/m_{TM}\geq0.2$.

4. The vacuum insulation element (1; 1') according to claim 1, characterized in that at a maximum water absorption below 50% humidity, the change in volume or swelling of the drying agent in the interspace between the inner film and the outer film (6, 10; 6', 10') is 5% or less, or is 2% or less, or is 1% or less, relative to the dry state.)

5. The vacuum insulation element (1; 1') according to claim 1, characterized by a cellulose-free drying agent.

6. The vacuum insulation element (1; 1') according to claim 1, wherein the drying agent is selected from the group consisting of zeolite and calcium oxide.

7. The vacuum insulation element (1; 1') according to claim 1, characterized in that in the shell material (13; 13') in the interspace between the inner film and the outer film (6, 10; 6', 10'), the volume ratio of drying agent to pressure-resistant, porous material is 1:2 or greater than 1:2, or is 1:1 or greater than 1:1, or is 2:1 or greater than 2:1, or is 3:1 or greater than 3:1, or is 5:1 or greater than 5:1, or is 7:1 or greater than 7:1, or is 9:1 or greater than 9:1.

8. The vacuum insulation element (1; 1') according to claim 1, characterized in that the space within the inner film (10; 10') is evacuated to a residual pressure ($p_1$), or to a residual pressure ($p_1$) of 5 mbar or less than 5 mbar, or to a residual pressure ($p_1$) of 2 mbar or less than 2 mbar, or to a residual pressure ($p_1$) of 1 mbar or less than 1 mbar, or to a residual pressure ($p_1$) of 0.5 mbar or less than 0.5 mbar, or to a residual pressure ($p_1$) of 0.2 mbar or less than 0.2 mbar, or to a residual pressure ($p_1$) of 0.1 mbar or less than 0.1 mbar.

9. The vacuum insulation element (1; 1') according to claim 1, characterized in that the space between the inner film and the outer film (6, 10; 6', 10') is evacuated to a residual pressure ($p_2$), or to a residual pressure ($p_2$) of 100 mbar or less than 100 mbar, or to a residual pressure ($p_2$) of 50 mbar or less than 50 mbar, or to a residual pressure ($p_2$) of 20 mbar or less than 20 mbar, or to a residual pressure ($p_2$) of 10 mbar or less than 10 mbar, or to a residual pressure ($p_2$) of 5 mbar or less than 5 mbar, or to a residual pressure ($p_2$) of 2 mbar or less than 2 mbar.

10. The vacuum insulation element (1; 1') according to claim 1, characterized in that the space within the inner film (10; 10') is evacuated to a lower residual pressure ($p_1$) than the residual pressure ($p_2$) in the space between the outer film and the inner film (6, 10; 6', 10'):

$$p_1 < p_2.$$

11. The vacuum insulation element (1; 1') according to claim 1, characterized in that the space between the outer film and the inner film (6, 10; 6', 10') is evacuated to approximately the same residual pressure ($p_2$) as the residual pressure ($p_1$) in the space within the inner film (10; 10'), wherein: $|\Delta p|=|p_1-p_2|\leq 10$ mbar, or wherein: $|\Delta p|=|p_1-p_2|\leq 5$ mbar, or wherein: $|\Delta p|=|p_1-p_2|\leq 2$ mbar, or wherein: $|\Delta p|=|p_1-p_2|\leq 1$ mbar.

12. The vacuum insulation element (1; 1') according to claim 1, characterized in that at least the inner core (5; 5') or at least the shell material is made of a pressure-resistant, porous material, or of a pressure-resistant open-pore material having low thermal conductivity, or of at least a drying agent or of at least a getter material.

13. The vacuum insulation element (1; 1') according to claim 12, characterized by a powder, a foam, or glass fibers as the pressure-resistant, porous material.

14. The vacuum insulation element (1; 1') according to claim 12, characterized in that a filler material (5; 5') within the inner film (10; 10') has a different composition than the filler material (13; 13') in the interspace between the inner film and the outer film (6, 10; 6', 10').

15. The vacuum insulation element (1; 1') according to claim 12, characterized in that in the filler material (5; 5') within the inner film (10; 10'), the volume ratio of drying agent to pressure-resistant, porous material is 1:1 or less than 1:1, or is 1:2 or less than 1:2, or is 1:3 or less than 1:3, or is 1:4 or less than 1:4, or is 1:5 or less than 1:5, or is 1:7 or less than 1:7, or is 1:10 or less than 1:10.

16. The vacuum insulation element (1; 1') according to claim 1, characterized in that at least the inner core (5; 5') or at least a filler material is made of a fiber material, or of an inorganic fiber material, or of a fiber material having a thermal conductivity of 3 mW/(m*K) or less, or of mineral wool, rock wool, basalt fiber, or glass fiber, or of at least a drying agent or of at least a getter material.

17. The vacuum insulation element (1; 1') according to claim 1, characterized in that the inner core (5; 5') or the core material, has a cuboidal shape or a panel shape, with two mutually parallel base areas as well as two longitudinal sides and two end-face sides.

18. The vacuum insulation element (1; 1') according to claim 1, characterized in that the inner core (5; 5') is preformed.

19. The vacuum insulation element (1; 1') according to claim 1, characterized in that at least one getter is provided within the inner film (10; 10') for binding gas molecules, wherein the getter is a compound composed of a metal selected from a group consisting of aluminum, barium, titanium, and zirconium with a gas selected from a group consisting of oxygen, nitrogen, and hydrogen.

20. The vacuum insulation element (1; 1') according to claim 1, characterized in that the inner film (10; 10') is designed as an air-tight barrier film, or as a multilayer air-tight barrier film with at least one ply made of an ethene-vinyl alcohol copolymer, or as a metallized multilayer air-tight barrier film with at least one ply made of an ethene-vinyl alcohol copolymer, or as a multilayer air-tight barrier film with at least one ply made of an ethene-vinyl alcohol copolymer with a material portion of the ethene of 40 mol-% or less than 40 mol-%, or as a multilayer air-tight barrier film with at least one ply made of an ethene-vinyl alcohol copolymer with a material portion of the ethene of 35 mol-% or less than 35 mol-%, or as a multilayer air-tight barrier film with at least one ply made of an ethene-vinyl alcohol copolymer with a material portion of the ethene of 30 mol-% or less than 30 mol-%.

21. The vacuum insulation element (1; 1') according to claim 1, characterized in that the outer film has a water vapor permeability of 10 g/(m$^2$*a) or less, or of 5 g/(m$^2$*a)) or less, or of 2 g/(m$^2$*a) or less, or of 1 g/(m$^2$*a) or less, at standard conditions namely at 23° C., and 50% relative humidity.

22. The vacuum insulation element (1; 1') according to claim 1, characterized in that the outer film (6; 6') is designed as an at least air-tight barrier film or as an at least vapor tight barrier film, or as a metallized multilayer barrier film with at least one ply made of an ethene-vinyl alcohol copolymer, or as a multilayer barrier film with at least one ply made of an ethene-vinyl alcohol copolymer with a material portion of the ethene of 30 mol-% or greater than 30 mol-%, or as a multilayer barrier film with at least one ply made of an ethene-vinyl alcohol copolymer with a material portion of the ethene of 35 mol-% or greater than 35 mol-%, or as a multilayer barrier film with at least one ply made of an ethene-vinyl alcohol copolymer with a material portion of the ethene of 40 mol-% or greater than 40 mol-%.

23. The vacuum insulation element (1; 1') according to claim 1, characterized in that the outer film (6; 6') is made, at least partially, of aluminum or is at least covered with at least one aluminum film.

24. The vacuum insulation element (1; 1') according to claim 1, characterized in that the outer film (6; 6') is provided with an aluminum ply, or is covered with an aluminum film, on two oppositely situated surfaces.

25. The vacuum insulation element (1; 1') according to claim 1, characterized in that the outer film (6; 6') is sealed only to itself, but not to the inner film (10; 10').

26. The vacuum insulation element (1; 1') according to claim 1, characterized in that the inner film (10; 10') is completely folded onto the inner core (5; 5').

27. The vacuum insulation element (1; 1') according to claim 1, characterized in that five fold lines of the inner film (10; 10') converge at each corner of the inner core (5; 5').

28. The vacuum insulation element (1; 1') according to claim 1, characterized in that the inner film (10; 10') is sealed only to itself, but not to the outer film (6; 6').

* * * * *